United States Patent [19]

Shih et al.

[11] Patent Number: 5,132,831
[45] Date of Patent: Jul. 21, 1992

[54] ANALOG OPTICAL PROCESSING FOR THE CONSTRUCTION OF FRACTAL OBJECTS

[75] Inventors: I-Fu Shih, Los Alamitos; David B. Chang, Tustin; Norton L. Moise, Pacific Palisades, all of Calif.

[73] Assignee: Hughes Aircraft Company, Los Angeles, Calif.

[21] Appl. No.: 340,654

[22] Filed: Apr. 20, 1989

[51] Int. Cl.$^5$ .................. G02B 27/42; G06K 9/20; G06F 15/336

[52] U.S. Cl. .................. 359/107; 359/559; 359/561; 364/822; 382/42; 382/45; 382/46; 382/47

[58] Field of Search .......... 350/162.12, 162.13, 350/572, 320, 321; 382/41, 42, 44, 45, 46, 47; 364/815, 816, 822, 826; 359/107, 559, 561

[56] References Cited

U.S. PATENT DOCUMENTS

| | | | |
|---|---|---|---|
| 3,701,098 | 10/1972 | Acker | 382/45 |
| 4,350,443 | 9/1982 | Williamson | 350/162.13 |
| 4,509,834 | 4/1985 | Hodgson | 350/522 |
| 4,637,056 | 1/1987 | Sherman et al. | 350/162.13 |
| 5,076,662 | 12/1991 | Shih et al. | 359/559 |

Primary Examiner—Rodney B. Bovernick
Assistant Examiner—R. D. Shafer
Attorney, Agent, or Firm—Michael W. Sales; Wanda K. Denson-Low

[57] ABSTRACT

An analog optical processor for performing affine transformations and constructing fractal objects. An optical processor for optically performing an iterated affine transformation includes a rotating prism, an imaging lens and a translatable mirror, together with a pulsed laser as an input light source and an image detector array to record the final transformed image. The amount of rotation is determined by the setting of the rotating prism. The imaging lens provides the required magnification or demagnification. The translating mirror is shifted to provide the necessary translation. The pulsed image passes through the optical loop many times to perform the transformation. An optical Iterated Function System is implemented by connecting a plurality of the optical loops in parallel, together with shutters or beamsplitters for guiding the pulsed image to different loops according to the probabilities assigned by the Iterated Function System.

30 Claims, 2 Drawing Sheets

FIG. 2

ANALOG OPTICAL PROCESSING FOR THE CONSTRUCTION OF FRACTAL OBJECTS

BACKGROUND OF THE INVENTION

The present invention relates generally to analog optical processing, and more particularly to an analog optical processor for performing affine transformations and constructing fractal objects.

An affine transformation is a mathematical transformation equivalent to a rotation, translation, and contraction (or expansion) with respect to a fixed origin and coordinate system. In computer graphics, affine transformations can be used to generate fractal objects which have significant potential for modeling natural objects, such as trees, mountains and the like.

A set of affine transformations together with an associated set of probabilities form an Iterated Function System ("IFS") that can generate a fractal object. Each IFS comprises a set of affine transformations and an associated set of probabilities. See, e.g., L. Demko et al., "Construction of Fractal Objects with Iterated Function Systems," Computer Graphics, Vol. 19(3), pages 271-278 (July, 1985) SIGGRAPH '85 Proceedings. Presently, to find an IFS for a given object to be modeled, scientists must try many transformation functions. For each set of functions, millions of affine transformations will have to be done. It requires a great deal of time and money to do this with digital computers. Researchers have been using trial-and-error methods to find an IFS for an object to be modeled because no systematic method is known to exist.

It is therefore a primary objective of the present invention to provide a faster means of performing a great number of affine transformations, thus enabling a faster construction of fractal objects with Iterated Function Systems.

Another objective of the present invention is to provide an analog optical processing procedure instead of a digital processing procedure for performing affine transformations and constructing fractal objects.

Another objective of the present invention is to provide an analog optical processing procedure including elements to perform probability functions, and thus to comprise an optical IFS.

Another objective of the present invention is to provide an optical processor providing the advantages of high speed and parallelism to speed up the trial-and-error process of discovering a desired IFS.

SUMMARY OF THE INVENTION

These and other objects and advantages are achieved in accordance with the invention, wherein an analog optical processor performs affine transformations. The optical processor includes an optical rotating element such as a rotating prism, a translatable mirror for providing the required optical translation, and a lens for providing the required magnification or demagnification. These optical elements perform the rotation, translation and magnification or demagnification required by the particular affine transformation.

The initial set of (x,y) pairs that are to be affine transformed are presented at an initial input plane, e.g., by illuminating a two-dimensional object by a pulsed laser. The input data is passed through the rotating, translating and magnifying/demagnifying optical elements, so that the image formed at an intermediate image plane has undergone an affine transformation. This image is relayed through a beamsplitter to an image intensifier which amplifies the image to compensate for any optical losses in the loop. The intensified image is redirected through the optical loop to provide a subsequent input image to the optical loop, and undergoes the same affine transformation once again. After traveling the optical loop many times, the final result is recorded through the beamsplitter with a recording device such as an image detector array.

An optical Iterated Function System (IFS) is disclosed, which comprises a plurality of optical loops connected in parallel, each for performing a different affine transformation. Optical means such as a plurality of shutters are provided in order to implement the probability for each transformation which is defined by the IFS.

BRIEF DESCRIPTION OF THE DRAWINGS

These and other features and advantages of the present invention will become more apparent from the following detailed description of exemplary embodiments thereof, as illustrated in the accompanying drawings, in which.

DETAILED DESCRIPTION OF THE PREFERRED EMBODIMENT

Figure 1:
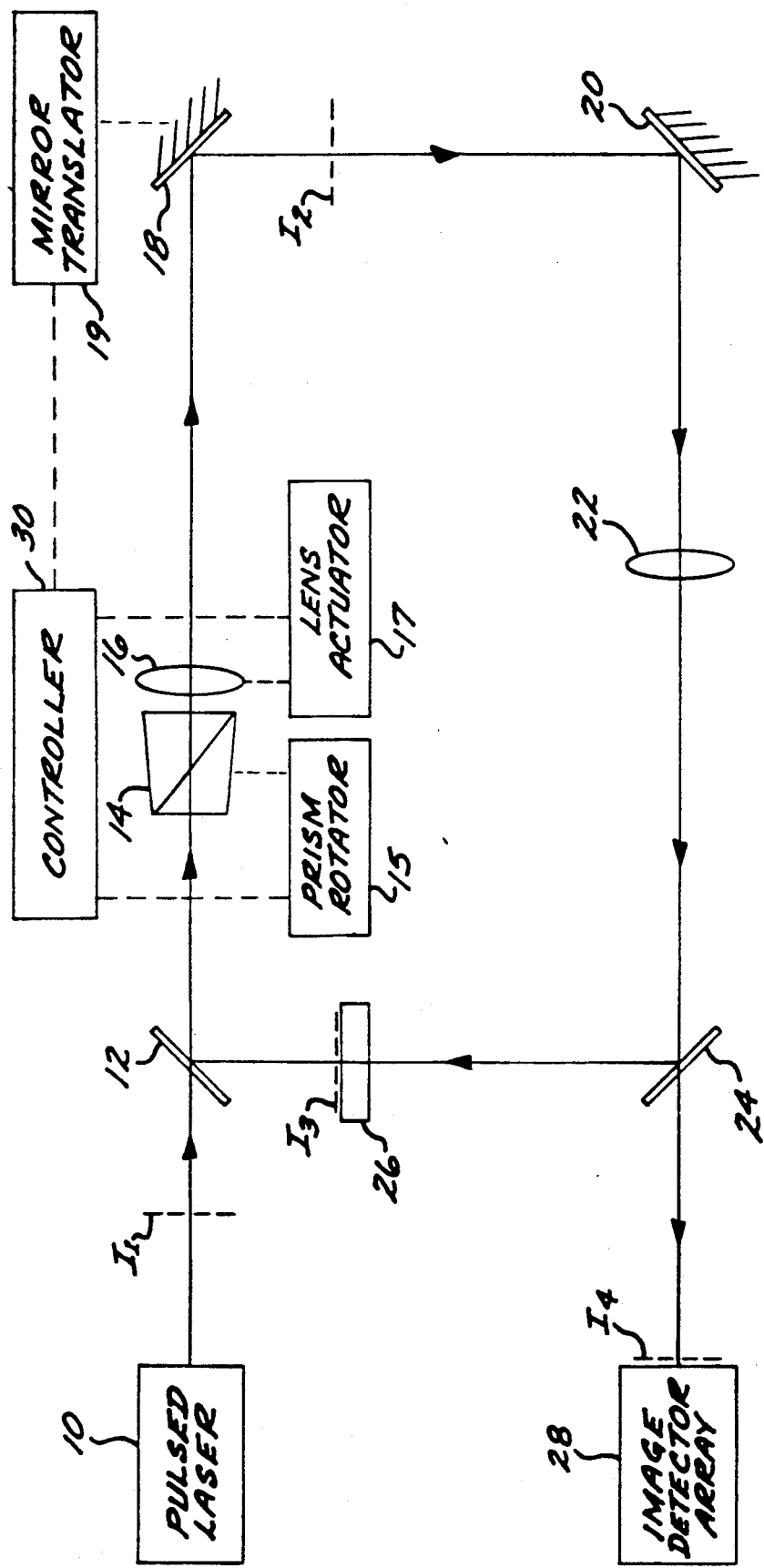
FIG. 1 is a simplified schematic of an analog optical processor for performing affine transformations in accordance with the invention.

FIG. 1 is a simplified schematic diagram illustrating an optical affine transformation system in accordance with the present invention. Here, the input light source for the optical transformer is the pulsed laser 10, which generates a pulse of laser light directed through the initial input plane I1 to a beamsplitter 12. The beamsplitter 12 is arranged so that the input light pulse from the laser 10 passes through the beamsplitter 12 to the rotating prism 14. The prism 14 serves to rotate the image of the incident light by a predetermined angular rotation, in accordance with the particular transformation being performed by the system. The rotated light beam is then passed through an imaging lens 16, which focuses the light at the intermediate image plane I2, after the light has been reflected by the translating mirror 18. The imaging lens 16 provides a magnification or demagnification as required by the subject affine transformation. The placement of mirror 18 within some desired mirror displacement range determines the optical distance traveled by the image pulse.

The light reflected by the mirror 18 passes through the intermediate image plane I2 and is reflected by the folding mirror 20, which directs the input light through a relay lens 22. The lens 22 focuses the light through a beamsplitter 24 to a subsequent image plane I3 and the output image plane I4. Thus, the beamsplitter 24 splits the incident beam from the relay lens 22 into two beams, passing the output beam to the output image plane where it is detected by the image detector array 28 disposed at the output plane I4. A portion of the beam from the relay lens 22 is split off to the image intensifier device 26, disposed before the subsequent image plane I3. The device 26 amplifies the incident light energy, and passes the amplified light energy to the beamsplitter 12, which serves to reflect the intensified light energy toward the rotating prism 14, where the optical loop just described is traversed again. The purpose of the image intensifier 26 is to boost the image brightness to compensate for any losses accumulated during the optical loop cycle. Theoretically, the more times the light traverses the loop, the better, as the transformed image will converge to a finer image.

An example of a device suitable for the purpose of image intensifier 26 is the image intensifier device, model P8079DC, available from English Electric Valve, Inc., Elmsford, N.Y.

The image detector array 28 may comprise a silicon photodiode array or CCD array such as is commonly used in commercially available solid state video cameras.

The input image source should be capable of generating a light pulse of very short duration, much shorter than the time it takes for the light to traverse the optical loop once. This loop traverse time is typically on the order of nanoseconds. This prevents the input laser light from overlapping the transformed image light. Moreover, only a single light pulse is generated to perform a given affine transformation. Light sources are available which meet these requirements. For example, a solid-state pulsed Nd:YAG laser is suitable for the purpose; one such commercially available laser is the model BLS-635 laser, marketed by A-B Lasers, Inc. Semiconductor laser diodes of the type used in fiber optic communications may also be employed. One commercially available semiconductor laser diode is the model PLS20-7 laser diode, marketed by Opto-Electronics, Inc.

The optical processor of FIG. 1 may be provided with means for adjusting the optical contribution provided by the optical elements 14, 16 and 18, in order to configure the processor to perform different affine transformations. For example, the rotating prism may be mechanically mounted in a rotatable fixture, which may be driven by a stepper motor to provide a desired optical rotation. The prism rotator is shown generally as element 15 in FIG. 1. An imaging lens 16 may be employed which is adjustable over a range of magnifications and/or demagnifications; a zoom lens may be employed, for example. The lens 16 may be actuated by a mechanism or actuator, generally indicated as element 17 in FIG. 1, which may also comprise a stepper motor drive, to adjust the zoom lens elements to provide the desired magnification/demagnification. The translating mirror 18 is mounted for translational movement along the optical path; one exemplary mechanism includes a leadscrew driven carriage which carries the mirror 18, and a stepper motor drive which turns the leadscrew to place the mirror 18 at a desired position. The mirror translator is generally shown as element 19 of FIG. 1. If the necessary range of movement of the mirror 18 is sufficiently large, it may be necessary to also mount mirror 20 on a translatable apparatus so that the mirrors 18 and 20 move in parallel synchronism. A controller 30 may provide appropriate output signals to drive the prism rotator 15, lens actuator 17 and mirror translator 19.

To operate the optical transformer of FIG. 1 to carry out a desired transformation, elements 14, 16 and 18 are appropriately positioned for the transformation. The initial set of (x,y) pairs that will be affine transformed are presented at the initial input plane I1 as a two-dimensional object, e.g., a transparency which contains a set of points whose coordinates are the initial set of (x,y) pairs. The pulsed laser 10 illuminates the input object, which is imaged to the intermediate image plane 12 through the imaging lens 16 that provides a magnification or demagnification of factor "m" as required by the subject affine transformation. The required amount of rotation can be generated by the setting of the rotating prism 14, which may comprise, for example, a Harting-Dove prism or a Pechan prism. The required translation is created by shifting the translating mirror 18 to the required position along the optical path. The optical system of FIG. 1 is designed with sufficient depth of focus so that a slight change of path length will not introduce significant blur; that is, a sharp image can be formed at the intermediate image plane 12. The pulsed image thus formed at the image plane 12 represents the original data having undergone an affine transformation.

Beamsplitters for performing the functions of devices 12 and 24 are well known in the art. See, for example, W.J. Smith, "Modern Optical Engineering," pages 94–95, McGraw-Hill (1966).

To iterate this process, the transformed image at image plane 12 is relayed to the subsequent input plane 13 through the relay lens 22 and the image intensifier device 26, which boosts image brightness to compensate for any losses accumulated during this cycle. Now the image formed at the subsequent image plane 13 serves as the subsequent input image and goes through the same affine transformation once again. The pulsed image can travel this optical loop many, many times to converge to the final image, and the final result is recorded through the beamsplitter 24 with a device such as the image detector array 28.

Figure 2:
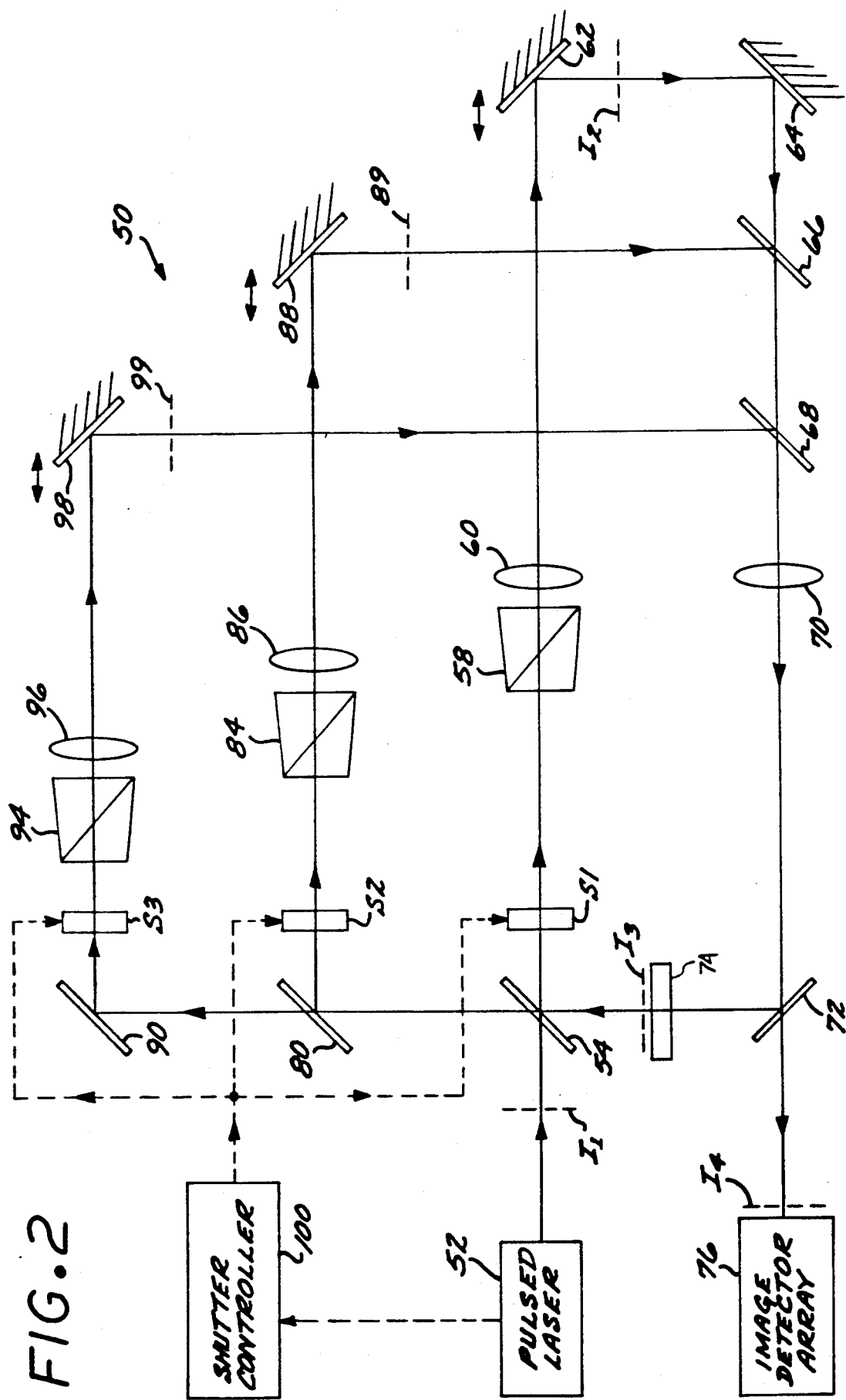
FIG. 2 is a simplified schematic of an embodiment of an Iterated Function System in accordance with the invention.

When several of these basic optical loops are connected together in parallel, an IFS can be constructed if a means is provided to guide the pulsed image to different loops according to the probability assigned by the IFS. For example, FIG. 2 shows an IFS 50 comprising three different affine transformations. A shutter is introduced into each of the three optical loops. These shutters (S1, S2 and S3) are operated by a shutter controller 100, which opens and closes the shutter according to a predetermined probability as designated by the IFS.

The input image to the IFS 50 is provided at input image plane I1, by a pulsed laser 52 whose beam passes through an image defining transparency, as in the embodiment of FIG. 1. The laser 52 performs the same function as the image source for the optical processor of FIG. 1. The input image is incident on beamsplitter 54, which passes part of the incident light energy to the shutter S1 and reflects a portion of the incident energy to the second and third optical function loops. The branching ratios of the beamsplitters 54, 80 and 90 are such that the light intensities will be the same in all loops.

The shutter S1 (as well as S2 and S3) is switchable between opaque and transparent states by the controller 100. If it is in the transparent state, light is passed to the rotating prism 58, the lens 60 and the translatable mirror 62, which serve similar optical processing functions as the prism 14, lens 16 and mirror 18 of the embodiment of FIG. 1. The pulsed image formed at the intermediate image plane I2 represents the original data having undergone a first affine transformation. To iterate the process, the transformed image at 12 is relayed to the subsequent image plane 13 via mirror 64, relay lens 70, beamsplitter 72 and image intensifier 74, which perform similar functions to the elements 20, 22, 24 and 26 of FIG. 1. An image detector array 76 records the final image received through the beamsplitter 72.

Two additional beamsplitters 66 and 68 are interposed in the optical path between the mirror 64 and lens 70, as shown in FIG. 2. These beamsplitters introduce the transformed images resulting from the second and third optical affine transformations performed by the system 50. The second optical transformation is performed by the optical loop comprising the elements 80, S2, 84, 86 and 88. The third optical transformation is performed by the optical loop comprising elements 90, S3, 94, 96 and 98.

A portion of the input image light incident on the beamsplitter 54 is reflected toward beamsplitter 80, where a first portion of this incident energy is reflected to the second optical shutter S2, and a second portion is transmitted through the beamsplitter 80 to mirror 90, where this incident energy is reflected toward the third optical shutter S3.

The second optical loop includes a rotating prism 84, a lens 86 and a translatable mirror 88, which perform similar functions as the corresponding elements 14, 16 and 18 of FIG. 1. Thus, the pulsed image formed at the intermediate image plane 89 represents the original data having undergone a second optical affine transformation. This pulsed image is then transmitted to the beamsplitter 66, which reflects this second optical loop image data toward the lens 70 for inclusion with the first optical loop image data.

In a similar fashion, the third optical loop includes a rotating lens 94, a lens 96 and translatable mirror 98, which perform similar functions as the corresponding elements 14, 16 and 18 of FIG. 1. Thus, the pulsed image formed at the intermediate image plane 99 represents the original data having undergone a third optical affine transformation. This pulsed image is then transmitted to the beamsplitter 68, which reflects this third optical loop image data toward the lens 70, for inclusion with the first and second optical loop image data.

Additional optical loops may be added to the IFS 50 as required to perform an additional number of affine transformations as required for a particular application.

If desired for a given application, the respective rotating prisms 58, 84 and 94 may each be provided with prism rotators similar to the prism rotator 16 described with respect to FIG. 1. Similarly, a lens actuator may be provided for each of the lens elements 60, 86 and 96, and a mirror translator similar to mirror translator 19 of FIG. 1 may be provided for each translating mirror 62, 88 and 98. A controller may be provided to control the respective positions of the optical elements 58, 60 and 62 of the first optical loop elements 84, 86 and 88 of the second optical loop, and elements 94, 96 and 98 of the third optical loop to configure the system 50 to provide the desired set of affine transformations. For simplicity, the controller and the respective prism rotators, lens actuators and mirror translators are omitted from FIG. 2.

As is well known, the compressed image for the particular IFS is represented by the orientation and locations of the optical rotating, magnifying/demagnifying and translating elements which define the affine transformations, and the associated probabilities.

If image degradation is a problem, Fourier optics filters can be added in the system to remove noise. As is well known to those skilled in the art, such filters would typically be placed at the image planes of the optical loops.

One exemplary technique for controlling the optical shutters S2, S2 and S3 employs a random number generator. Assume, for example, that the probabilities associated with an IFS having three optical loops to perform three affine transformations are 30%, 60% and 10%. Thus, over the time required to form the resultant IFS image, 30% of the intensity of the image will be directed through a first optical loop, 60% through a second optical loop, and 10% through the third optical loop. Each time the image light traversed the optical loops, the respective selected shutters are randomly opened/closed so as to achieve these probabilities. The random number generator can be employed to randomly produce, once each time the light traverses the IFS 50, a number in the range from 0 to 100. If the generated number is in the range of 0-30, only the shutter for the first loop is opened for the corresponding traverse of the image light through the IFS. If the number generated is from 31 to 90, only the shutter for the second loop is opened. If the number generated is from 91 to 100, then only the shutter for the third loop is opened.

An exemplary optical shutter device suitable for the purpose is a high speed mechanical shutter. Alternatively, the functions of the shutters S1, S2 and S3 can be replaced by beamsplitters with branching ratios appropriate for the desired probabilities. A further alternative is to replace the optical shutters with neutral density filters. Such a filter could comprise a pair of counter-rotating polarizers driven by a stepper motor to vary the amount of light transmitted through the filter.

If the function of the optical shutters S1, S2 and S3 is replaced by beamsplitters, the branching ratios of the beamsplitters are selected to implement the probabilities required for the particular IFS. The IFS 50 of FIG. 2 can be modified by removal of the optical shutters, and the beamsplitters 54, 80 and 90 employed to perform the function of the shutters, instead of providing an equal intensity distribution to the optical loops. Thus, for the example just given, the branching ratios of the beamsplitters 54, 80 and 90 would be selected so that 30% of the intensity of the image light is passed to the first optical loop, 60% of the image light is passed to the second optical loop, and 10% of the image light is passed to the third optical loop. The advantage of the use of beamsplitters to implement the probabilities is in the simplicity, since no shutter controller is required. However, because the branching ratios are fixed for conventional beamsplitters, their use for this purpose would limit the system to a particular IFS; to implement different probabilities, beamsplitters with the required (different) branching ratios would be substituted.

It is understood that the above-described embodiments are merely illustrative of the possible specific embodiments which may incorporate the present invention. Other arrangements may readily be devised in accordance with these principles by those skilled in the art without departing from the scope of the invention.

What is claimed is:

1. An analog optical method for performing affine transformations, comprising a sequence of the following steps:
   providing an input optical image;
   optically magnifying or demagnifying the input image as required by the affine transformation;
   optically rotating said image by an amount required by the affine transformation;

optically translating said input image by an amount required by the affine transformation whereby an output transformed image is generated; and iteratively passing the transformed image through said steps of magnifying/demagnifying, optically rotating and optically translating.

2. The method of claim 1 wherein said step of providing an input optical image comprises providing an initial set (x,y) pairs that will be affine transformed at an initial input plane as a two-dimensional object illuminated by a pulsed laser.

3. The method of claim 1 wherein said step of magnifying or demagnifying the input image comprises imaging said input image through an imaging lens that provides a desired magnification or demagnification.

4. The method of claim 1 wherein said step of optically rotating said input image comprises passing the image through a rotating prism.

5. The method of claim 1 wherein said step of optically translating said image comprises placing a translating mirror at a desired position.

6. An analog optical processor for performing an affine transformation, comprising:
means for providing an input image at an input image plane;
means for optically magnifying or demagnifying the input image as required for the affine transformation;
means for optically rotating said image as required by the affine transformation; and
means for optically translating said input image by an amount required by the affine transformation whereby an output transformed image is generated;
said respective magnifying/demagnifying means, optical rotating means and optical translating means are arranged in an optical loop wherein said transformed image is provided at a subsequent image plane, and further comprising:
means for iteratively passing the transformed image through said optical loop;
an image detector; and
beam splitting means disposed in said optical loop between said subsequent image plane and said image detector to direct a first portion of the transformed image toward said image detector, and a second portion of said transformed image toward said means for rotating thereby completing said loop.

7. The optical processor of claim 6 wherein said means for providing an input image comprises a pulsed laser for providing a pulse of laser light to illuminate said input object disposed at an input image plane, and wherein the pulse duration is shorter than the time required for the input image light to traverse said optical loop.

8. The optical processor of claim 7 wherein said laser comprises a Nd:YAG laser.

9. The optical processor of claim 7 wherein said laser comprises a solid-state laser diode.

10. The optical processor of claim 7 wherein said input object is a two dimensional object of (x,y) pairs, and comprises a transparency illuminated by said pulsed laser.

11. The optical processor of claim 6 wherein said means for iteratively passing comprises an image intensifier for boosting the transformed image brightness to compensate for optical losses accumulated through the optical loop, and an optical means for directing the subsequent transformed input image through the optical loop.

12. The optical processor of claim 11 wherein said optical directing means comprises a beamsplitter arranged to receive the subsequent transformed image and the input image and direct said images through the optical loop.

13. The optical processor of claim 6 wherein said means for magnifying or demagnifying the input image comprises an imaging lens for focusing the transformed image at an image plane.

14. The optical processor of claim 13 wherein said imaging lens comprises a zoom lens, and means for adjusting the magnification or demagnification of the lens to that required by the affine transformation.

15. The optical processor of claim 6 wherein said means for optically rotating the image comprises a rotating prism.

16. The optical processor of claim 15 further comprising means for positioning said rotating prism to optically rotate said prism by an amount required by the subject affine transformation.

17. The optical processor of claim 6 wherein said means for optically translating comprises a translatable mirror and means for translating said mirror by an amount required by the affine transformation.

18. An analog optical iterated function system comprising a set of affine transformations and an associated set of probabilities, comprising:
means for providing an input image to be processed by the iterated function system;
a plurality of optical loops, one each for performing a corresponding affine transformation on said input image, each loop comprising means for magnifying or demagnifying a loop input image, means for optically rotating the loop input image, and means for optically translating the loop input image, as required for the affine transformation; and
means for optically guiding the input image through the different optical loops according to the probabilities assigned by the iterated function system.

19. The iterated function system of claim 18 wherein said optical guiding means comprises a plurality of optical shutters, one each disposed in a respective optical loop, and a means for opening and closing the respective optical shutters according to the respective predetermined probabilities determined by the iterated function system.

20. The iterated function system of claim 19 wherein said means for opening and closing the respective optical shutters comprises a shutter controller for providing control signals to said respective shutters.

21. The iterated function system of claim 18 wherein said means for optically guiding a first beamsplitter for directing a first portion of the input image light to a first one of the optical loops and directing a second portion of the input image light for use in said remaining optical loops.

22. The iterated function system of claim 18 wherein said means for optically translating the respective loop input images comprises a plurality of mirrors, one for each optical loop, and wherein each optical loop provides a transformed image at an intermediate image plane within the optical loop, and wherein a first one of the optical loops further comprises an optical combiner means for directing transformed image light from said other optical loops into said first optical loop.

23. The iterated function system of claim 18 wherein said means for optically rotating said loop image comprises a plurality of rotating prisms, one for each said optical loop.

24. The iterated function system of claim 18 wherein said means for magnifying or demagnifying said loop input image comprises a plurality of imaging lens, one for each of the optical loops.

25. The iterated function system of claim 18 further comprising means for relaying the respective transformed images through said system to serve as a subsequent input image to the system.

26. The iterated function system of claim 25 wherein said relaying means comprises an image intensifier for boosting the transformed image brightness to compensate for optical losses accumulated through the optical loops, and an optical combiner disposed to receive the input image and the subsequent, intensified, transformed images and direct said images through said optical loops.

27. The iterated function system of claim 18 further comprising an image detector and a beamsplitter disposed in said first optical loop to direct a portion of said respective transformed images to said image detector.

28. The iterated function system of claim 18 wherein said means for providing an input image comprises a pulsed laser for providing a pulse of laser light, and wherein the pulse duration is shorter than the time required for the input image light to traverse the optical loops.

29. The optical processor of claim 28 wherein said laser comprises a Nd:YAG laser.

30. The optical processor of claim 28 wherein said laser comprises a solid-state laser diode.

* * * * *